United States Patent Office 3,449,218
Patented June 10, 1969

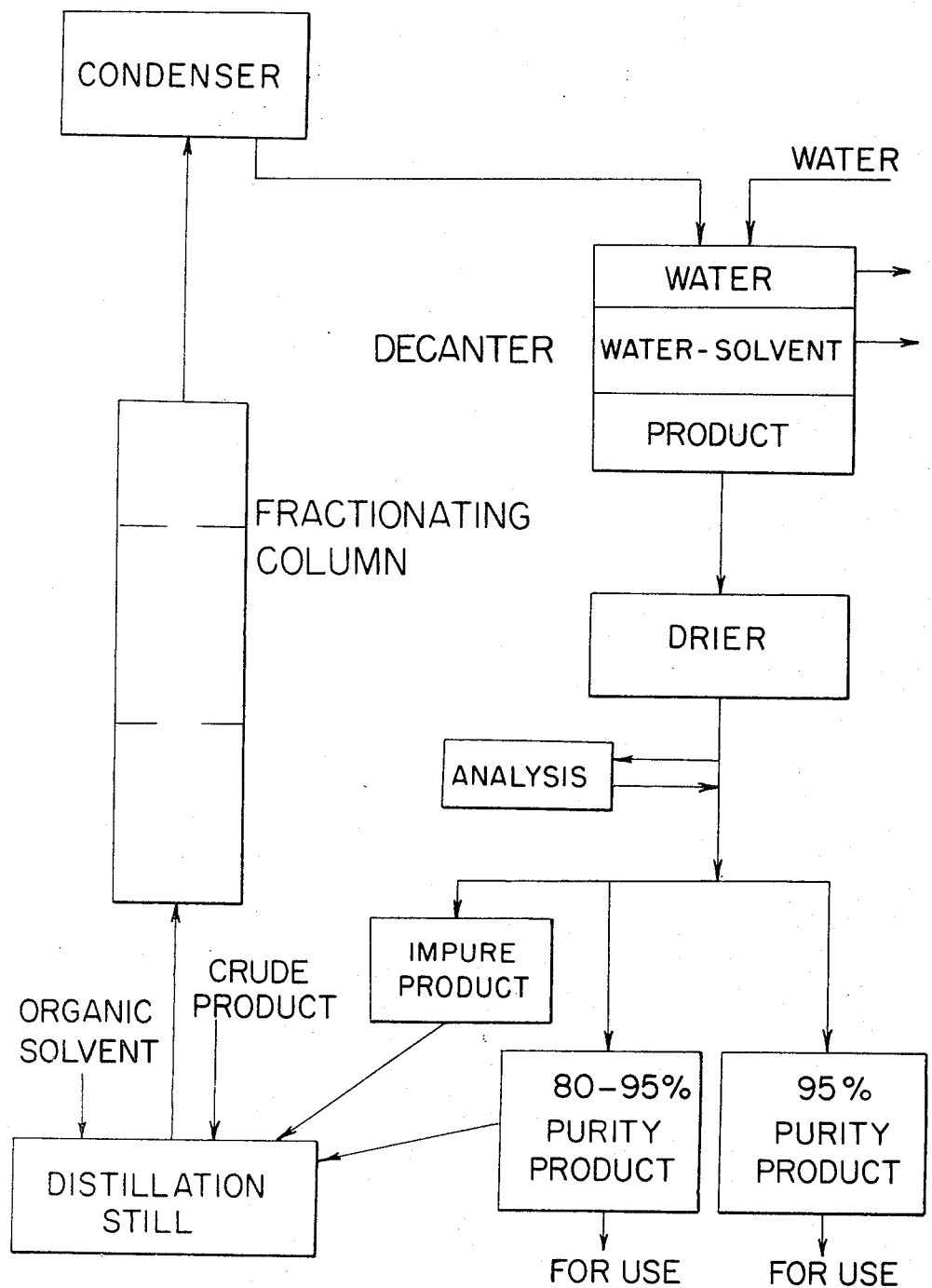

3,449,218
PROCESS FOR THE SEPARATION OF MIXTURES OF ALIPHATIC FLUORINE COMPOUNDS BY AZEOTROPIC DISTILLATION WITH AN OXYGENATED HYDROCARBON
Horst Jaeger, Bettingen, Switzerland, assignor to Ciba Limited, Basel, Switzerland, a company of Switzerland
Filed Feb. 15, 1967, Ser. No. 616,193
Claims priority, application Switzerland, Feb. 23, 1966, 2,635/66
Int. Cl. C07c *17/38;* B01d *3/36*
U.S. Cl. 203—44             8 Claims

ABSTRACT OF THE DISCLOSURE

The separation of mixtures of fluorinated n-alkanes and n-alkenes is very difficult. Mixtures of aliphatic fluorine compounds whose chains contain 7 to 18 carbon atoms can be separated by subjecting them in admixture with an inert solvent, e.g. acetone, to azeotropic distillation. The solvent should have a solubility of at least 5 g./100 ml. of water. The fluorine compounds are isolated from the individual distillates advantageously by the addition of water to the distillates.

---

Very pure fluorine compounds can be obtained by repeating the process with one or several fractions.

By fluorinating n-alkanes and n-alkenes with cobalt trifluoride as fluorine donor there are obtained mixtures of fluorinated and perfluorinated alkanes. The separation of such mixtures is extremely difficult. When the mixture is treated with concentrated aqueous alkali hydroxide solution, for example a potassium hydroxide solution of 50% strength, hydrogen fluoride is split off from the un-perfluorinated fluoralkanes, and fluoralkenes are formed. The separation of the constituent components from such mixtures is likewise very difficult. In this sphere the present process constitutes an important step forward.

It has been found that mixtures of aliphatic fluorine compounds whose chains contain 7 to 18 carbon atoms can be readily separated by subjecting them in admixture with an inert organic solvent, having a solubility of at least 5 g./100 ml. of water, to azeotropic distillation and then isolating the fluorine compounds from the individual distillates.

The accompanying sheet of drawing is a schematic illustration of the process of this invention.

The mixtures of aliphatic fluorine compounds, whose chains contain 7 to 18 carbon atoms, to be subjected to the distillation may have a widely varying composition insofar as the number and constitution of their components are concerned. These mixtures can be prepared, for example, by fluorinating n-alkanes and n-alkenes whose chains contain 7 to 18, preferably 7 to 14, carbon atoms. Accordingly, the compounds concerned may be perfluorinated or incompletely fluorinated compounds (for example n-ω H-fluoralkanes) containing no hydrogen or one or several hydrogen atoms, for example by fluorination of n-heptane, n-octane, n-nonane, n-decane, n-dodecane, n-tetradecane, n-hexadecane, n-octadecane or the corresponding N-alkenes. Among the alkenes the n-alkene-1 compounds are preferred, for example n-heptene-1, n-octene-1, n-nonene-1, n-decene-1, n-dodecene-1, n-tetradecene-1, n-hexadecene-1 or n-oceadecene-1. The present process may be performed with mixtures of fluorine compounds whose chains contain 7 to 14, and especially mixtures of fluorine compounds whose chains contain 7 to 12 carbon atoms.

This new separating method is applicable not only to mixtures obtained by fluorinating a single alkane or alkene, but also to mixtures of fluorine compounds of different alkanes or alkenes. It is also possible to fluorinate n-alkanes whose chains contain 7 to 18 carbon atoms and which have been halogenated with chlorine or bromine. In this manner the following compounds, for example, may be formed:

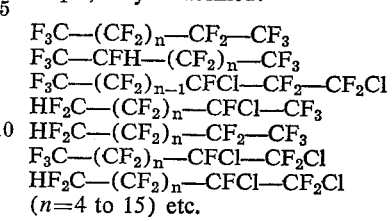

$(n=4$ to 15) etc.

By thermal isomerization all these compounds may also be branched.

When the saturated fluorine compounds are pyrolyzed or treated with potassium hydroxide, they give rise to unsaturated fluorine compounds, which are also obtained by treating, for example, 1,2-dichloro-fluoro compounds with metallic zinc in an alcoholic solution, accompanied by elimination of chlorine.

For separating mixtures of fluorine compounds by the present process an organic solvent is required as the so-called azeotropic entraining agent. The organic solvent used must be inert, that is to say it must not react with the fluorine compounds to be isolated during the distillation. Furthermore, it must be water-soluble, that is to say that at least 5 g. of the solvent should be soluble in 100 ml. of water. It is also advantageous to use solvents composed exclusively of carbon, hydrogen and oxygen. As relevant examples there may be mentioned dioxane, tetrahydrofuran, acetone, ethylmethylketone, ethyl acetate, alkanols containing 1 to 5 carbon atoms, tetrahydrofurfuryl alcohol and glacial acetic acid. Particularly suitable entraining agents are solvents of the kind referred to having a molar heat of vaporization of 30 ±2 kilojoules and a dipole moment (according to Stuart) greater than $1.70 \times 10^{18}$. So far it has not been possible to separate mixtures of fluorinated n-alkanes by fractional distillation without use of an entraining agent.

The azeotropic distillation according to the present process may be carried out in any known device. The individual temperature stages are in general very sharply pronounced so that the temperature range of any one fraction is for all practical purposes about 0.3 to 2° C. It is, of course, advantageous when the qualitative and quantitative composition of the mixture to be separated is exactly known before it is treated according to the present process. This composition is easy to determine by way of gas chromatography.

The individual distillates or fractions obtained by the azeotropic distillation are then treated to yield the fluorine compounds. Advantageously, the individual distillate is mixed with sufficient water to enable the organic solvent to dissolve in the aqueous dilution. From this aqueous phase the fluorine compound, which settles out as the second liquid phase, is easy to isolate and, if required, it may be dried and purified. If it is desired to manufacture fluorine compounds of a very high degree of purity, the process may be repeated, isolating the fluorine compounds from one or several fractions of the azeotropic distillation and subjecting them once again to the azeotropic distillation described above.

Percentages in the following example are by weight.

EXAMPLE

A mixture of acetone (or ethyl acetate or tetrahydrofuran or dioxane or methylethylketone or glacial acetic acid or tetrafurfuryl alcohol) and highly fluorinated n-aliphatic compounds containing 7 to 14 carbon atoms is subjected to a distillation in an electrically heated still. The distillation is carried out in a silver-plated Dewar column of 2 m. height, filled with stainless steel wire mesh filler bodies; the column has an automatically controlled column head. The reflux ratio is 1:10.

Fractions of a boiling range of 0.3 to 1° C. are collected. The individual fractions are taken out of the receptacle and the solvent is removed from them by adding water. The non-aqueous bottom layer, which contains the fluorine compound, is dried over sodium sulphate and subjected to gas chromatographic examination for its purity. In the following table the results of a few distillations carried out in this manner are listed. The individual columns contain the following data:

(II) Solvent, composition and quantity (III) Composition of the mixture subjected to the distillation, first the total quantity and then the percentual shares of the constituent components.

(IV) Separated fractions, with the following data:

(a) Yield in percent, referred to the quantity of the individual compound shown in Column II.
(b) Purity: Percentual content of the compound of the formula shown in the separated fraction.
(c) Content in percent of the compound of the formula shown in the fraction, the remainder up to 100% being the solvent according to II.
(d) Boiling range of the fraction.

The structure and purity of the compounds $n-C_7F_{16}$  $C_{13}F_{28}$
$n-C_8F_{17}H$  $n-C_8F_{18}$
$C_{12}F_{26}$  $C_{10}F_{22}$
$n-C_7F_{15}H$  $C_{14}F_{30}$
$n-C_9F_{20}$ $C_7F_{14}$ = perfluoroheptene-1 and perfluoroheptene-2 as well as perfluoropropylene dimers and trimers (Example 14) was found by gas chromatography and mass spectrum analyses.

| I | II | III | | IV |||||
|---|---|---|---|---|---|---|---|---|
| | | | | Separated fractions |||||
| | | | | (a) = Yield<br>(b) = Purity<br>(c) = Content of fluorine compound in the azeotropic mixture<br>(d) = Boiling range in ° C. |||||
| No. | Quantity, Solvent | Mixture to be separated— | | $n-C_7F_{16}$ | $n-C_7F_{15}H$ | $n-C_8F_{18}$ | $n-C_8F_{17}H$ |
| | | Quantity | Composition | | | | |
| 1 | 700 g. ethyl acetate | 1,415 g. of mixture contain: | | (a) 83.86%<br>(b) 95.5%<br>(c) 69.23%<br>(d) 60.0–60.5 | (a) 69.96%<br>(b) 93.0%<br>(c) 78.44%<br>(d) 72–72.5 | | |
| | | 3.92% | $C_6F_{14}$ | | | | |
| | | 24.79% | $C_7F_{16}$ | | | | |
| | | 24.90% | $C_7F_{15}H$ | | | | |
| | | 46.33% | $C_7F_xH_y{}^1$ | | | | |
| | | $^1(y=2-15\quad x=14-1)$. | | | | | |
| 2 | 500 g. ethyl acetate | 940 g. of mixture contain: | | | | (a) 47.90%<br>(b) 97.67%<br>(c) 75.23%<br>(d) 67.5–67.8 | (a) 65.96%.<br>(b) 97.96%.<br>(c) 69.54%.<br>(d) 74.0–74.6. |
| | | 6.54% | $C_7F_{16}$ | | | | |
| | | 19.01% | $C_8F_{18}$ | | | | |
| | | 23.87% | $C_8F_{17}H$ | | | | |
| | | 2.41% | $C_8F_{16}H_2$ | | | | |
| | | 53.96% | $C_8F_xH_y{}^1$ | | | | |
| | | $^1(y=2-17\quad x=16-1)$. | | | | | |
| 3 | 400 g. ethyl acetate | 510 g. of mixture contain: | | | | (a) 68.90%<br>(b) 99.0%<br>(c) 75%<br>(d) 67–68 | (a) 23.61%.<br>(b) 93.1%.<br>(c) 69%.<br>(d) 75 constant. |
| | | 0.77% | $C_7F_{16}$ | | | | |
| | | 43.82% | $C_8F_{18}$ | | | | |
| | | 17.00% | $C_8F_{17}H$ | | | | |
| | | 0.65% | $C_8F_{16}H_2$ | | | | |
| | | 48.75% | $C_8F_xH_y{}^1$ | | | | |
| | | $^1(y=2-17\quad x=16-1)$. | | | | | |

| I | II | III | | IV ||||
|---|---|---|---|---|---|---|---|
| | | | | Separated fractions ||||
| | | | | (a) = Yield<br>(b) = Purity<br>(c) = Content of fluorine compound in the azeotropic mixture<br>(d) = Boiling range in ° C. ||||
| No. | Quantity, Solvent | Mixture to be separated— | | $n-C_7F_{16}$ | $n-C_8F_{18}$ | $n-C_9F_{20}$ |
| | | Quantity | Composition | | | |
| 4 | 400 g. acetone | 689 g. of mixture contain: | | (a) 85.77%<br>(b) 99.5%<br>(c) Not measured<br>(d) 38–40 | (a) 67.09%<br>(b) 98.7%<br>(c) Not measured<br>(d) 43.5–44 | (a) 63.58%.<br>(b) 99.4%.<br>(c) Not measured.<br>(d) 46.5–47. |
| | | 1.53% | $C_6F_{14}$ | | | |
| | | 16.96% | $C_7F_{16}$ | | | |
| | | 31.27% | $C_8F_{18}$ | | | |
| | | 5.09% | $C_8F_{17}H$ | | | |
| | | 14.93% | $C_9F_{20}$ | | | |
| | | 30.20% | $\begin{cases}C_7F_xH_y{}^1\\C_8F_xH_y{}^2\\C_9F_xH_y{}^3\end{cases}$ | | | |
| | | $^1(x=14-1\quad y=2-15)$.<br>$^2(x=16-1\quad y=2-17)$.<br>$^3(x=18-1\quad y=2-19)$. | | | | |
| 5 | 500 g. tetrahydrofuran | 490 g. of mixture contain: | | (a) 65.71%<br>(b) 98.9%<br>(c) Not measured<br>(d) 41–43 | (a) 80.87%<br>(b) 96.1%<br>(c) Not measured<br>(d) 60.0–61.5 | |
| | | 6.95% | $C_7F_{16}$ | | | |
| | | 23.50% | $C_8F_{18}$ | | | |
| | | 3.68% | $C_8F_{17}H$ | | | |
| | | 3.40% | $C_9F_{20}$ | | | |
| | | 62.47% | $\begin{cases}C_7F_xH_y{}^1\\C_8F_xH_y{}^2\\C_9F_xH_y{}^3\end{cases}$ | | | |
| | | $^1(x=14-1\quad y=2-15)$.<br>$^2(x=16-1\quad y=2-17)$.<br>$^3(x=18-1\quad y=2-19)$. | | | | |

| I | II | III | | IV |
|---|---|---|---|---|
| | | | | Separated fractions |
| | | | | (a) = Yield<br>(b) = Purity<br>(c) = Content of fluorine compound in the azeotropic mixture<br>(d) = Boiling range in ° C. |
| No. | Quantity, Solvent | Mixture to be separated— | | |
| | | Quantity | Composition | |

| No. | Quantity, Solvent | Mixture to be separated (Quantity / Composition) | n-$C_7F_{16}$ | n-$C_7F_{15}H$ | n-$C_8F_{18}$ | n-$C_9F_{20}$ |
|---|---|---|---|---|---|---|
| 6 | A. 500 g. acetone | A. 1419 g. of mixture contain:<br>4.07% $C_6F_{14}$<br>51.96% $C_7F_{16}$<br>5.95% $C_7F_{15}H$<br>37.98% $C_7F_xH_y$[1]<br><br>After $C_6F_{14}+C_7F_{16}$ has been distilled off azeotropically with acetone, and the fluorinated substance has been freed from acetone by washing with water. | (a) 89.99%<br>(b) 96.00%<br>(c) 70.00%<br>(d) 45.5–46.5 | | | |
| | B. 300 g. ethyl acetate | B. 580 g. of mixture (fluorinated residue from distillation A) containing:<br>1.7% $C_7F_{16}$<br>12.1% $C_7F_{15}H$<br>86.2% $C_7F_xH_y$[1]<br>azeotropically distilled.<br>[1]($x=14-11$  $y=2-15$). | | (a) 71.79%<br>(b) 80.00%<br>(c) 47.01%<br>(d) 69–71 | | |
| 7 | 800 g. acetone | 2,250 g. of mixture contain:<br>0.58% $C_6F_{14}$<br>0.90% $C_7F_{16}$<br>38.71% $C_8F_{18}$<br>2.57% $C_9F_{17}H$<br>57.24% $C_8F_xH_y$[1]<br><br>Distillation discontinued after extraction of $C_8F_{18}$.<br>[1]($y=2-17$  $x=16-1$). | | | (a) 67.56%<br>(b) 92.05%<br>(c) 89.19%<br>(d) 50.5–52.0 | |

| No. | Quantity, Solvent | Mixture to be separated | $C_7F_{14}$ heptene-2 | | | |
|---|---|---|---|---|---|---|
| 8 | 560 g. acetone | 360 g. of mixture of gaseous substance such as:<br>58.34% {$C_3F_6$ / $C_4F_8$}<br>6.63% {$C_5F_{10}$ / $C_6F_{12}$}<br>32.22% $C_7F_{14}$<br>2.78% $C_7F_{16}$ | (a) 98%<br>(b) 99%<br>(c) 60%<br>(d) 45–47 | | | |

| No. | Quantity, Solvent | Mixture to be separated | | | | |
|---|---|---|---|---|---|---|
| 9 | 800 g. acetone | 2,619 g. of mixture of:<br>10.96% {$C_7F_{16}$ / $C_8F_{18}$}<br>32.14% $C_9F_{20}$<br>56.88% $C_9F_xH_y$[1]<br><br>Distillation discontinued after extraction of $C_9F_{20}$.<br>[1]($y=1-19$  $x=19-1$). | (a) 49.29%<br>(b) 95.0%<br>(c) 91.25%<br>(d) 52.5–52.9 | | | |

| No. | Quantity, Solvent | Mixture to be separated | n-$C_7F_{14}$ heptene-1 | n-$C_7F_{14}$ heptene-2 | | |
|---|---|---|---|---|---|---|
| 10 | 80 g. acetate | 27 g. of mixture of:<br>0.87% $C_6F_{12}$<br>8.43% $C_7F_{14}$ heptene-2<br>88.1% $C_7F_{14}$ heptene-1<br>0.99% $C_7F_{15}H$<br>Remainder to 100% further impurities. | (a) 53.13%<br>(b) 96.8%<br>(c) 59.8%<br>(d) 49–49.5 | (a) 13.2%<br>(b) 63.4%<br>(c) 45%<br>(d) 45–47 | | |

| No. | Quantity, Solvent | Mixture to be separated | n-$C_7F_{16}$ | n-$C_8F_{18}$ | n-$C_9F_{20}$ | n-$C_{10}F_{22}$ |
|---|---|---|---|---|---|---|
| 11 | 800 g. methylethylketone | 1,032 g. of mixture of $C_7$–$C_{14}$ perfluoralkanes of which:<br>2.9% $C_7F_{16}$<br>4.03% $C_9F_{20}$<br>7.33% $C_{10}F_{20}$<br>Remainder mixture of $C_nF_xH_y$, where:<br>($n=7-14$  $x=10-30$  $y=1-20$) | (a) 80.32%<br>(b) 85.5%<br>(c) 37.4%<br>(d) 55.6–56.5 | | (a) 37.74%<br>(b) 93.6%<br>(c) 43.8%<br>(d) 66.5–67.5 | (a) 68.42%<br>(b) 92.5%<br>(c) 96.0%<br>(d) 72.7–73.3.<br><br>The higher-boiling constituents cannot be separated with methylethylketone. |

| No. | Quantity, Solvent | Mixture to be separated | $C_{12}F_{26}$ | $C_{13}F_{28}$ | $C_{14}F_{30}$ | |
|---|---|---|---|---|---|---|
| 12 | 1,000 g. glacial acetic acid | 750 g. of mixture of $C_nF_xH_y$, where:<br>($n=7-14$  $x=10-30$  $y=1-20$) | Derivative, where C<12 atoms, cannot be separated with acetic acid. | (a) 19.0%[1]<br>(b) 81.4%<br>(c) 31.6%<br>(d) 114.3–116.0 | Cannot be separated | |

[1] Of the total quantity of 750 g.

| I | II | III | | IV |
|---|---|---|---|---|
| | | Mixture to be separated— | | Separated fractions<br>(a) = Yield<br>(b) = Purity<br>(c) = Content of fluorine compound in the azeotropic mixture<br>(d) = Boiling range in °C. |
| No. | Quantity, Solvent | Quantity | Composition | n-C₇F₁₆ / C₁₂F₂₆ / C₁₃F₂₈ / C₁₄F₃₀ |
| 13 | 1,000 g. tetrahydrofurfuryl alcohol. | 800 g. of a mixture of CₙFₓHᵧ where: (n=7–14  x=10–30  y=1–20) | Perfluoralkanes, where C<12 atoms, cannot be separated. | n-C₇F₁₆: (a) 18.6%¹ (b) 89.7% (c) 90.3% (d) 98–98.5 ;  C₁₂F₂₆: (a) 13.2%¹ (b) 90.5% (c) 77.7% (d) 152–153 ;  C₁₃F₂₈: (a) 2%¹ (b) 78% (c) 27.2% (d) 170–175 ;  (C₁₄F₃₀ column) |

¹ Of the total quantity of 800 g.

| No. | Quantity, Solvent | Quantity of mixture | Composition | Perfluoro-4-methyl-pentene-2 | Perfluoro-2-methyl-pentene-2 | Perfluoro-2,4,5-trimethyl-hexene-2 | |
|---|---|---|---|---|---|---|---|
| 14 | 40 g. methylethylketone | 32 g. of a mixture of: | 13.4% perfluoro-4-methyl-pentene-2.<br>7.18% perfluoro-2-methyl-pentene-2.<br>14.26% perfluoro-2,4,5-trimethyl-hexene-2.<br>27.86% perfluoro-2,3-5-trimethyl-hexene-3.<br>31.47% perfluoro-2,3,5-trimethyl-hexene-2.<br>5.80% perfluoro-dodecene-mixture. | (a) 53%<br>(b) 90.1%<br>(c) 45%<br>(d) 36.0–36.5 | (a) 47%<br>(b) 92.3%<br>(c) 47.5%<br>(d) 47.0–47.8 | (a) 62.5%<br>(b) 91.2%<br>(c) 55.3%<br>(d) 77.8–78.5 | Perfluoro-2,3,5-trimethyl-hexene-3 and perfluoro-2,3,5-trimethyl-hexene-2 cannot be separated with methylethylketone. |

I claim:

1. Process for separating a mixture comprised solely of a plurality of open-chain fluorocarbons having 7 to 18 carbon atoms, which comprises subjecting the mixture, in an inert organic solvent having a solubility of at least 5 g. in 100 ml. of water and which is an entrainer for said fluorocarbons, to azeotropic distillation and isolating fluorocarbon fractions which comprise the mixture from the individual azeotropic distillates.

2. The process according to claim 1 wherein said mixture is comprised of a plurality of open-chain fluorocarbons having 7 to 14 carbon atoms.

3. The process according to claim 2 wherein said individual azeotropic distillates are mixed with sufficient water to enable the organic solvent to dissolve in the dilution.

4. The process according to claim 3 wherein said organic solvent consists exclusively of carbon, hydrogen and oxygen.

5. The process according to claim 4 wherein said inert organic solvent is selected from the groups consisting of acetone, ethylmethylketone, dioxane, ethyl acetate, tetrahydrofuran, an alkanol with 1 to 5 carbon atoms, tetrahydrofurfuryl alcohol and acetic acid.

6. The process according to claim 1 wherein said mixture is comprised solely of a plurality of open-chain n-fluorocarbons having 7 to 18 carbon atoms.

7. The process according to claim 1 wherein said mixture is comprised solely of a plurality of open-chain members selected from the group consisting of n-fluorocarbon alkanes and n-fluorocarbon alkenes having 7 to 18 carbon atoms.

8. The process according to claim 1 wherein said mixture is comprised of a substantial content of n-perfluoroheptane, n-perfluorooctane and n-perfluorononane.

References Cited

UNITED STATES PATENTS

| | | | |
|---|---|---|---|
| 2,442,589 | 6/1948 | Evans et al. | 203—62 |
| 2,549,609 | 4/1951 | Johnson | 260—653 |
| 2,604,439 | 7/1952 | Nixon | 203—62 |

WILBUR L. BASCOMB, JR., *Primary Examiner.*

U.S. Cl. X.R.

203—58, 60, 61, 62, 63; 260—653